United States Patent [19]

Mahdjuri et al.

[11] 4,134,391
[45] Jan. 16, 1979

[54] SOLAR COLLECTOR COMPRISING AN ELONGATE DEWAR VESSEL

[75] Inventors: Faramarz Mahdjuri, Aachen; Horst Hörster, Roetgen; Reinhard Kersten, Meischenfeld, all of Fed. Rep. of Germany

[73] Assignee: U.S. Philips Corporation, New York, N.Y.

[21] Appl. No.: 795,008

[22] Filed: May 9, 1977

[30] Foreign Application Priority Data

May 19, 1976 [DE] Fed. Rep. of Germany ....... 2622252

[51] Int. Cl.² .............................................. F24J 3/02
[52] U.S. Cl. ..................................... 126/271; 165/142
[58] Field of Search ................ 126/270, 271; 237/1 A; 165/142; 138/38

[56] References Cited

U.S. PATENT DOCUMENTS

| 3,227,153 | 1/1966 | Godel et al. | 126/271 |
| 3,957,029 | 5/1976 | Nozik | 126/271 |
| 3,981,293 | 9/1976 | Gillery | 126/271 |
| 3,983,861 | 10/1976 | Beauchaine | 126/271 |
| 4,016,860 | 4/1977 | Moan | 126/271 |

FOREIGN PATENT DOCUMENTS

71213 10/1959 France ...................................... 126/270

Primary Examiner—Kenneth W. Sprague
Assistant Examiner—James C. Yeung
Attorney, Agent, or Firm—Frank R. Trifari; Rolf E. Schneider

[57] ABSTRACT

A solar collector comprising an elongate solid cylindrical body extending lengthwise into an elongate cylindrical Dewar-type vessel in a manner to form annular-shaped supply and outlet ducts for a heat-transport medium, the sum of the cross-sectional areas of the supply and outlet ducts being less than one-quarter of the inner cross-sectional area of the vessel.

6 Claims, 3 Drawing Figures

SOLAR COLLECTOR COMPRISING AN ELONGATE DEWAR VESSEL

This invention relates to a solar collector, comprising an elongate Dewar-type vessel of a transparent material which is formed by an outer tube, an inner tube having an outer diameter which is smaller than the inner diameter of the outer tube, and an evacuated intermediate space, and also comprising an elongate element which projects into the vessel and by means of which at least one supply duct and at least one outlet duct for a heat transport medium are formed inside the vessel, the outer surface of the inner tube being provided over at least part of its cylindrical circumference with a solar radiation absorbing layer, the inner surface of the inner tube opposite the layer forming part of the boundary of one of the two ducts for transferring heat obtained from absorbed solar radiation during operation to the heat transport medium conducted through the relevant duct.

In a known solar collector of the described kind, a thin-walled supply duct for water as the heat transport medium centrally projects into the vessel, the outer diameter of the said supply duct being substantially smaller than the inner diameter of the inner tube of the vessel. The annular duct formed between the supply duct and the inner tube of the vessel acts as an outlet duct.

Except for the space occupied by the thin-walled supply duct, the vessel is completely filled with water during operation. This means that such solar collector has a high heat capacity.

A drawback of such high heat capacity consists in that the solar collector has a long heating-up time during which the collector cannot be used for heating purposes.

The present invention has for its object to provide a solar collector of the kind set forth in which the described drawback is eliminated.

To this end, the solar collector in accordance with the invention is characterized in that the sum of the cross-sectional areas of the supply duct and the outlet duct is smaller than one quarter of the inner cross-sectional area of the inner tube.

Thus, only a relatively limited quantity of heat transport medium is always present in the solar collector, which means a low heat capacity and hence a relatively short heating-up time.

A preferred embodiment of the solar collector in accordance with the invention is characterized in that the elongate element consists of an at least substantially cylindrical, solid body which is centrally arranged in the vessel and which has a diameter smaller than the inner diameter of the inner tube, an annular space being thereby formed between the inner tube and the body, two lengthwise flanges being arranged diametrically opposite each other on the body and extending to the inner surface of the inner tube, the said flanges thus sub-dividing the annular space into the supply duct and the outlet duct.

A simple construction is thus obtained. The solid body may be made, for example, of a synthetic material.

In a further preferred embodiment of the solar collector of the invention, the side of the vessel which is remote from the solar radiation absorbing layer is provided with a metallic mirror. This mirror reflects solar radiation to the solar radiation absorbing layer, so that radiation losses are reduced. In accordance with the invention, the metallic mirror can be provided either on the outer surface of the inner tube or on the inner surface of the outer tube.

Preferably, the metallic mirror on the inner surface of the outer tube is constructed to be diffuse, the solar radiation absorbing layer on the outer surface of the inner tube then extending over the entire cylindrical circumference of the inner tube. This results in a further reduction of the radiation losses.

The diffuse mirror can be obtained, for example, in a chemical manner, for example, by dipping an etched glass tube in a silver nitrate solution.

A still further preferred embodiment of the solar collector in accordance with the invention is characterized in that the inner surface of the outer tube is provided, at least over the portion which is remote from the metallic mirror, with a solar radiation-transmitting but infrared-reflective layer.

A solar radiation-transmitting ($\lambda = 0.3 - 2$ microns) but heat-reflective ($\lambda = 3 - 30$ microns) layer of this kind may be made, for example, of gold or of tin-doped indium oxide.

The invention will now be described in more detail with reference to the accompanying diagrammatic drawing, in which.

Figure 1:
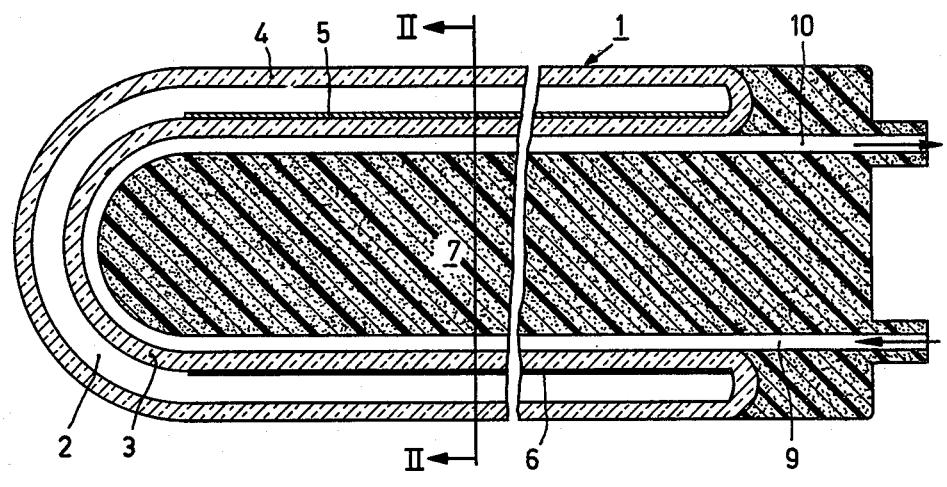
FIG. 1 is a longitudinal sectional view of an embodiment of the solar collector in accordance with the invention.
Figure 2:
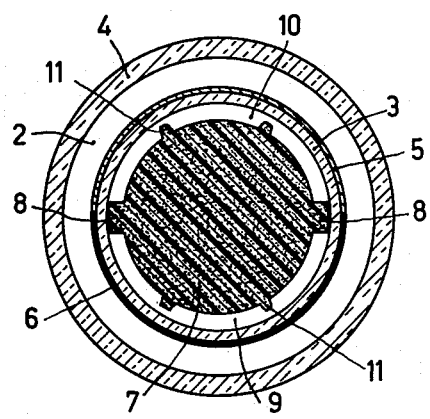
FIG. 2 is a cross-sectional view taken along the line II — II of FIG. 1.

The solar collector shown in FIGS. 1 and 2 comprises an elongate, double-walled Dewar vessel 1 of glass which encloses an evacuated annular space 2 and which is formed by an inner tube 3 and an outer tube 4. On its vacuum surface, the inner tube 3 is covered over one half its cylindrical circumference with a selective solar radiation absorbing layer 5, for example, made of nickel oxide or copper oxide on a metal substrate consisting of, for example, copper or aluminium. On the other, lower half-cylinder on the vacuum surface of the inner tube 3, there is provided a metallic reflective layer 6 consisting of, for example, silver or aluminium.

An elongate solid body 7 consisting of, for example, silicone or polyurethane foam is centrally arranged in the inner tube 3 of the Dewar vessel 1; this body seals the Dewar vessel 1 watertight relative to the inner tube 3, has a smaller diameter than the inner tube 3, and includes two flanges 8 which are arranged diametrically opposite each other and which contact the inner tube 3 so that two annular-shaped thin ducts 9 and 10 are formed between the solid body 7 and the inner tube 3, the lower duct 9 serving as a supply duct, whilst the upper duct 10 serves as an outlet duct for a heat transport medium like water. The solid body 7 furthermore includes several axially extending projections 11.

The solid body 7 has a cross-section such that the sum of the cross-sectional areas of the supply duct 9 and the outlet duct 10 is smaller than one quarter of the internal cross-sectional area of the inner tube 3. It is thus achieved that only a limited quantity of water is present in the solar collector.

Figure 3:
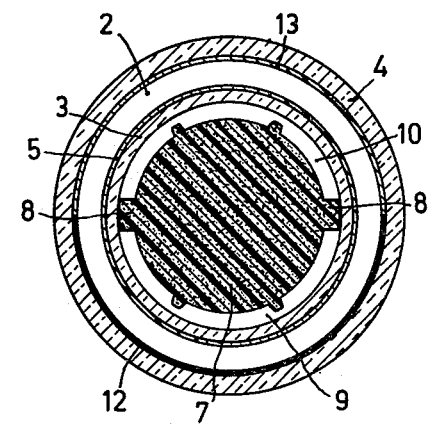
FIG. 3 is a cross-sectional view of a further embodiment of the solar collector in accordance with the invention.

The construction of the solar collector shown in FIG. 3 is similar to that of the solar collector shown in FIGS. 1 and 2. Corresponding parts are denoted by the same reference numerals. However, the vacuum surface of the inner tube 3 is now completely covered with a selective solar radiation absorbing layer 5. On the vacuum surface of the outer tube 4 a diffuse metallic mirror 12 is provided in the region of the lower cylinder half, the said mirror being obtained either by deposition of silver or aluminium on the etched glass surface or by chemical deposition of a reflective layer by means of a silver nitrate solution. The upper cylinder half of the outer tube 4 is covered on its vacuum surface with a selective heat-reflective layer 13 which is made, for example, of tin-doped indium oxide.

In a practical embodiment, the outer diameter of the Dewar vessel 1 is 6.5 cm and the inner diameter 6.0 cm. The distance between the inner tube 3 and the outer tube 4 is between 1 to 2 mm. In cases where this distance is greater than 2 mm, the metallic reflective layer 6 on the lower half of the inner tube 3 is preferably diffuse.

When a selective solar radiation absorbing layer 5 is used, it may be advantageous to reduce the cylindrical absorbing surface, because the heat radiation losses are directly proportional to the surface area. In this case the inner tube 3 would require a cross-sectional shape other than a circle.

In order to avoid heat radiation losses on the ends of the Dewar vessel 1, either the ends of the inner tube 3 on its vacuum surface or the ends of the outer tube 4 on its vacuum surface may be provided with a metallic reflective layer.

What is claimed is:

1. A solar collector which comprises an elongate Dewar-type transparent vessel formed of an outer cylindrical tube closed at one end, an inner cylindrical tube having an outer diameter less than the inner diameter of the outer tube and also closed at one end, the closed end of the inner tube being opposite and spaced from the closed end of the outer tube, the other ends of both tubes being sealed together to provide an evacuated space between said tubes, and an elongate cylindrical solid body extending lengthwise into the inner tube and having a rounded inner end spaced from the closed end of the inner tube, said body being centrally positioned within the inner tube and having a diameter less than the inner diameter of the inner tube whereby an annular space is formed between the inner tube and the body, said body being provided with two diametrically opposed lengthwise flanges each extending to the inner surface of the inner tube and thereby sub-dividing the annular space into a supply duct and an outlet duct for conduct of a heat-transport medium, said body being shaped at its outer end so as to form a water-tight joint with the sealed other ends of the outer tube and the inner tube, the outer surface of the inner tube being provided over at least part of its cylindrical circumference with a solar radiation-absorbing layer, the heat obtained from absorbed solar radiation during operation being transferred to the heat-transport medium conducted through the supply duct and the outlet duct, and the sum of the cross-sectional areas of the supply duct and the outlet duct being less than one-quarter of the inner cross-sectional area of the inner tube.

2. A solar collector according to claim 1, in which the side of the vessel remote from the solar radiation-absorbing layer is provided with a metallic mirror.

3. A solar collector according to claim 2, in which the metallic mirror is provided on the outer surface of the inner tube.

4. A solar collector according to claim 2, in which the metallic mirror is provided on the inner surface of the outer tube.

5. A solar collector according to claim 4, in which the metallic mirror is diffuse, the solar radiation-absorbing layer extending over the entire outer surface of the inner tube.

6. A solar collector according to claim 4, in which the balance of the inner surface of the outer tube is provided with a solar radiation-transmitting but infrared-reflective layer.

* * * * *